US008949903B2

(12) United States Patent
Gudlavenkatasiva et al.

(10) Patent No.: US 8,949,903 B2
(45) Date of Patent: Feb. 3, 2015

(54) FEATURE RECOMMENDATION FOR TELEVISION VIEWING

(75) Inventors: Bhaskar R. Gudlavenkatasiva, Tampa, FL (US); Nityanand Sharma, Tampa, FL (US); Sutap Chatterjee, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 13/212,236

(22) Filed: Aug. 18, 2011

(65) Prior Publication Data
US 2013/0047182 A1 Feb. 21, 2013

(51) Int. Cl.
| H04N 5/445 | (2011.01) |
| G06F 3/00 | (2006.01) |
| G06F 13/00 | (2006.01) |
| H04N 21/466 | (2011.01) |
| H04N 21/482 | (2011.01) |
| H04N 21/485 | (2011.01) |

(52) U.S. Cl.
CPC ........... *H04N 21/466* (2013.01); *H04N 21/482* (2013.01); *H04N 21/485* (2013.01)
USPC ......................................................... 725/52

(58) Field of Classification Search
None
See application file for complete search history.

(56) References Cited

U.S. PATENT DOCUMENTS

| 7,958,533 | B2* | 6/2011 | Kikinis et al. ................ 725/100 |
| 2005/0097601 | A1* | 5/2005 | Danker et al. .................. 725/39 |
| 2006/0200842 | A1* | 9/2006 | Chapman et al. ............... 725/34 |
| 2007/0169148 | A1* | 7/2007 | Oddo et al. ..................... 725/46 |
| 2008/0092168 | A1* | 4/2008 | Logan et al. .................... 725/44 |
| 2012/0143795 | A1* | 6/2012 | Han et al. ........................ 706/12 |
| 2012/0204201 | A1* | 8/2012 | Cassidy et al. .................. 725/10 |

* cited by examiner

*Primary Examiner* — Nathan Flynn
*Assistant Examiner* — Omar S Parra

(57) ABSTRACT

A method includes accessing television (TV) command data including a plurality of TV commands for controlling a TV. The plurality of TV commands includes at least one selection of a feature. The method may include identifying a first pattern of TV commands based on the TV command data. The first pattern of TV commands correlates with the at least one selection of a feature. The method may further include receiving a second pattern of TV commands. The method may include determining whether the second pattern of TV commands substantially matches the model pattern of TV commands. In addition, the method may include providing a feature recommendation based on the at least one selection of the feature in response to a determination that the second pattern of TV commands substantially matches the model pattern of TV commands.

17 Claims, 10 Drawing Sheets

| TV COMMAND TYPE 272 | EVENT TIME STAMP 274 | PRIOR VALUE 276 | CURRENT VALUE 278 |
|---|---|---|---|
| CHANNEL CHANGE 272a | 4/20/11 12:00 AM | 123 | 555 |
| RECORD 272b | 4/20/11 12:02 AM | | START |
| VOLUME CHANGE 272c | 4/20/11 12:03 AM | 15 | 26 |
| INFO 272l | 4/20/11 12:04 AM | | |
| CAPTION CHANGE 272e | 4/20/11 12:06 AM | ON | OFF |
| PAUSE 272g | 4/20/11 12:08 AM | | |
| RECALL 272f | 4/20/11 12:08 AM | | |
| POWER 272h | 4/20/11 12:11 AM | ON | OFF |
| MENU 272j | 4/20/11 12:12 AM | | |
| GUIDE 272k | 4/20/11 12:14 AM | | |
| AUX 272i | 4/20/11 12:14 AM | | |
| MUTE CHANGE 272d | 4/20/11 12:14 AM | OFF | ON |
| PIP 272m | 4/20/11 12:24 AM | OFF | ON 123 IN 555 |
| CHANNEL CHANGE 272a | 4/20/11 12:36 AM | 555 | 123 |

FEATURE RECOMMENDATION FOR TELEVISION VIEWING

BACKGROUND INFORMATION

Viewers watching a television (TV) interact with the TV through TV commands, which may be wired or wireless commands. TV commands are typically communicated to the TV through a sequence of button press events on a remote control device that provides a signal for the television and/or a set top box associated with the TV. Examples of TV commands include changing a channel, adjusting volume, muting the television, turning on captioning, recording a program, etc.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein relate to devices, methods, and systems for implementing feature recommendation for a TV based on matching a current pattern of TV commands with a model pattern of TV commands. Consistent with the embodiments described herein, TV commands may be analyzed to determine a customer's viewing habits and features may be recommended to the viewer based on current TV commands and past viewing habits.

Figure 1:
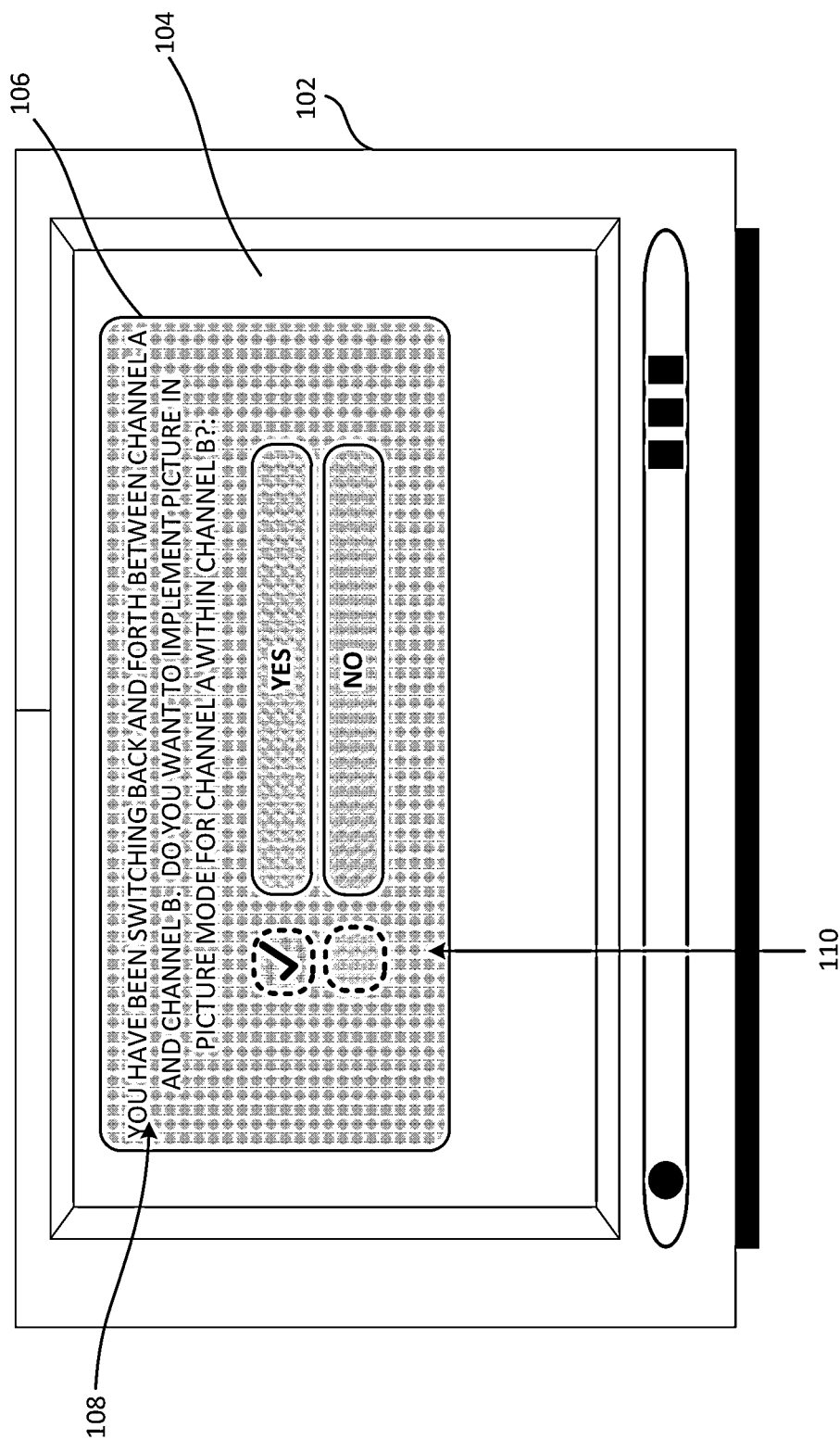
FIG. 1 is a diagram of an overview of an exemplary embodiment of a feature recommendation message on a television.

FIG. 1 is a diagram showing an example of one embodiment of a feature recommendation message provided to a television viewer. FIG. 1 shows a TV 102 with a display 104 that is located in a customer's home. TV 102 displays a feature recommendation message 108 in a dialog box 106 that recommends a feature to the television viewer. Feature recommendation message 108 may be provided based on matching a current pattern of TV commands with a model pattern of TV commands. A feature may include an application, computer program, and/or setting associated with TV 102. For instance, a feature may include an application, such as captioning, picture in picture (PIP) mode, etc., or settings, such as sharpness, brightness, volume, recording, high definition (HD) mode, recording mode, etc. A feature recommendation may comprise information regarding the feature, such as an existence and/or applicability of the feature to a television viewer's current TV activity. The terms "customer", "viewer", "television viewer" and "user" are used interchangeably in the description herein. The feature recommendation illustrated in FIG. 1 is for illustrative purposes only. Other configurations may be implemented. For example, feature recommendation message 108 may be directed toward additional, fewer and/or different features than those depicted in FIG. 1 and provide additional, fewer and/or different options than those depicted in FIG. 1.

Referring to FIG. 1, feature recommendation message 108 may prompt the viewer "You have been switching back and forth between channel A and channel B. Do you want to implement picture in picture mode for channel A within channel B?" Feature recommendation message 108 may also include a prompt to activate the recommended feature. For example, dialog box 106 displays one or more options 110 for the viewer. By selecting "yes", display 104 may be switched to a PIP mode that displays Channel A and Channel B simultaneously.

Figure 2A:
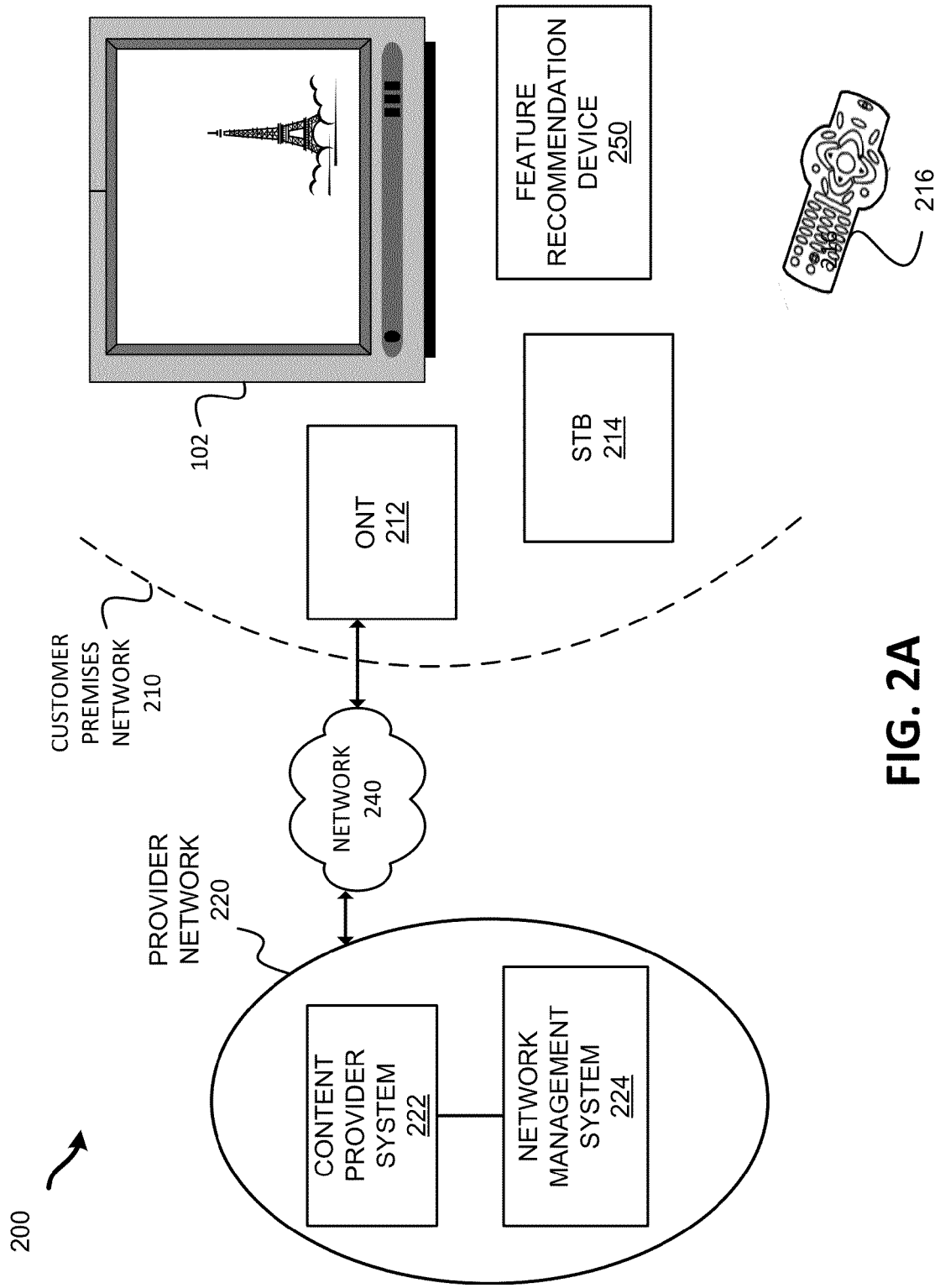
FIG. 2A illustrates an exemplary network in which systems and methods described herein may be implemented.

FIG. 2A is a diagram of an exemplary network 200 in which systems and/or methods described herein may be implemented. As illustrated, network 200 may include a customer premises network 210, and a provider network 220. Customer premises network 210 (e.g., the customer's home) may include an optical network terminal (ONT) 212, a set-top box (STB) 214, a TV 102, a remote control 216 and a feature recommendation device 250. Provider network 220 may include a content provider system 222, and a network management system 224. Customer premises network 210 and provider network 220 may be interconnected by network 240. Components of network 200 may be interconnected via wired and/or wireless connections. The configuration of components of network 200 illustrated in FIG. 2A is for illustrative purposes only. Other configurations may be implemented. Therefore, network 200 may include additional, fewer and/or different components than those depicted in FIG. 2A. Also, in some instances, one or more of the components of network 200 may perform one or more functions described as being performed by another one or more of the components of network 200.

Network 200 provides a platform for implementing feature recommendation based on, for example, matching a current pattern of TV commands with a model pattern of TV commands for TV 102 in customer premises network 210. The TV commands may allow the viewer to access and control an ever-growing amount and variety of content. For example, a viewer may change channels and choose between pay-per-view programs, on-demand programs, music programs, broadcast television programs, sports programs, movies, etc. The content may be selected based on particular channels and according to predetermined schedules. The content may be received as data provided from provider network 220 to customer premises network 210 based on TV commands. For example, the viewer may select a sports channel that provides an athletic event at recurring predetermined times.

ONT 212 may receive data, e.g., on a fiber optic cable, and may transfer the data to the appropriate device in customer premises network 210, such as STB 214. Likewise, ONT 212 may receive data from any device in customer premises network 210 and may transmit the data to other devices in customer premises network 210, e.g., through a fiber optic cable. ONT 212 may provide customer premises network 210 with television access, Internet access, or telephone service, for example. Additionally, ONT 212 may output data to provider network 220 through network 240.

STB 214 may receive content and output the content to TV 102 for display. STB 214 may include a component (e.g., a cable card or a software application) that plugs into a host device (e.g., a personal computer, TV 102, a stereo system, etc.) that allows the host device to display content. STB 214 may also be implemented as a home theater personal computer (HTPC), an optical disk player (e.g., digital video disk (DVD) or Blu-Ray™ disc player), a cable card, etc. STB 214 may receive commands from other devices in network 200, such as remote control 216. In one embodiment, STB 214 may include a microphone and/or a camera.

TV 102 may include speakers as well as display 104. TV 102 may play content, for example, received from STB 214. While some embodiments described below may use TV 102 to view content, other embodiments may use any device (e.g., a computer or a mobile phone) to display/provide content.

Remote control 216 may issue TV commands for controlling other electronic devices, such as TV 102 or STB 214. Remote control 216, in conjunction with STB 214, may allow a user to interact with an application running on STB 214. In some instances, other types of devices (e.g., a keyboard, mouse, mobile phone, etc.) may be used instead of remote control 216.

Feature recommendation device 250 may receive TV commands, for instance from remote control 216. Feature recommendation device 250 may match a current pattern of TV commands with a model pattern of TV commands and determine feature recommendations for TV 102, in conjunction with STB 214, as described below. In one implementation, feature recommendation device 250 may be implemented/integrated within STB 214.

Content provider system 222 may include one or more servers and one or more memory/storage devices. Content provider system 222 may provide media content to customer premises network 210. Additionally, content provider system 222 may provide metadata associated with the media content. According to one embodiment, content provider system 222 provides scheduled media content on a subscription and/or pay per view basis.

Network management system 224 may include one or more servers and one or more memory/storage devices. Network management system 224 may manage network 200 including supporting management functions in customer premises network 210, such as feature recommendation 108, as described below.

Network 240 may include a wired or wireless network. Network 240 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 240 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 240 may also include a wireless satellite network.

Figure 2B:
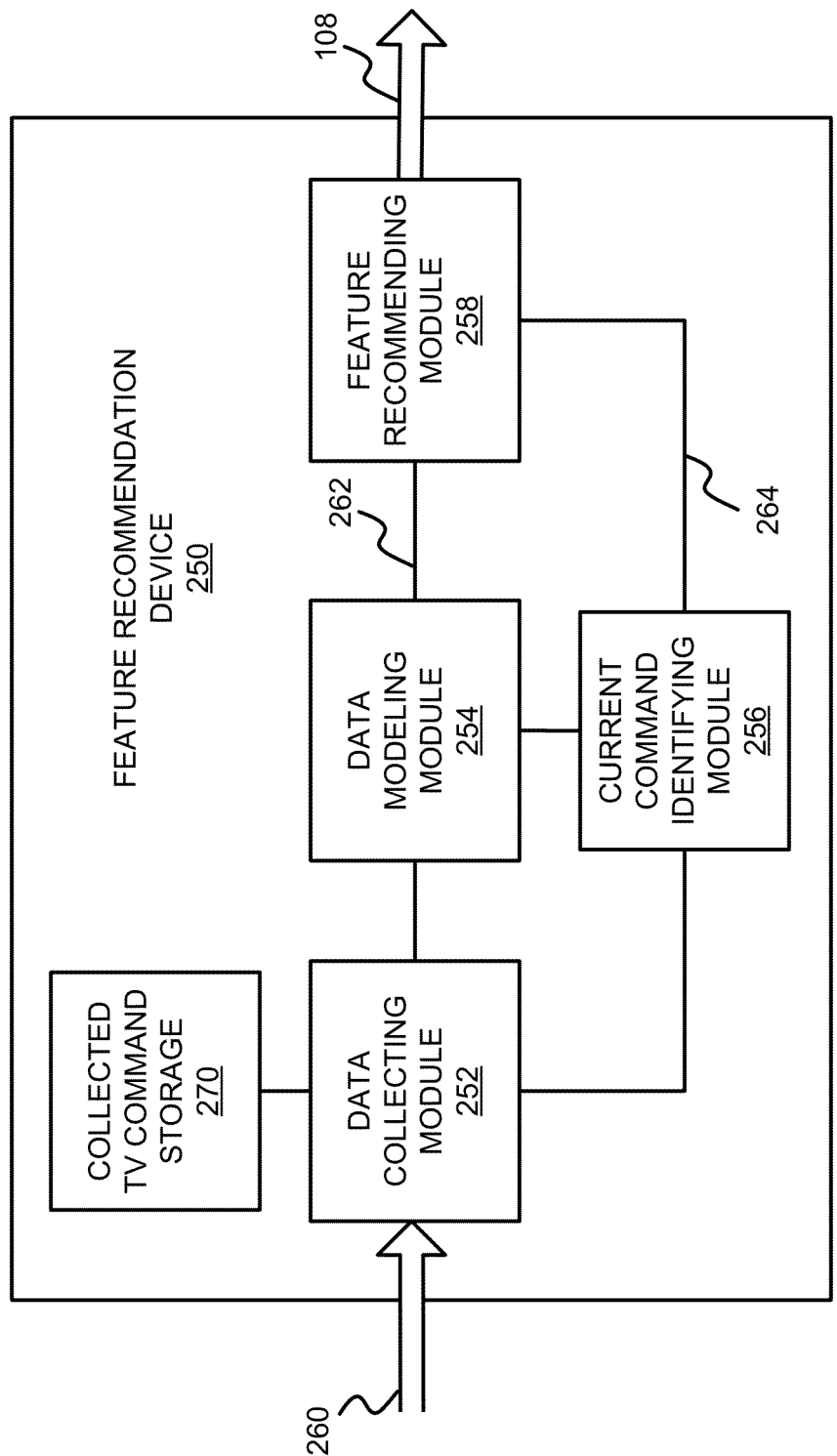
FIG. 2B is a functional block diagram of an exemplary feature recommendation device.

FIG. 2B illustrates an exemplary functional block diagram of feature recommendation device 250. Device 250 may comprise software, hardware, or a combination of hardware and software. According to an embodiment, feature recommendation device 250 may be a component of a set top box, such as STB 214 described above. Alternatively, device 250 may be implemented as part of TV 102, as a dongle that is operably connected to STB 214, etc. In another embodiment, device 250 may be implemented as a component of a remote control, such as a component of remote control 216, or as part of content provider system 222. Feature recommendation device 250 includes a data collecting module 252, a data modeling module 254, a current command identifying module 256, a feature recommending module 258, and collected TV command storage 270. The configuration of components of device 250 illustrated in FIG. 2B is for illustrative purposes only. Other configurations may be implemented. Therefore, device 250 may include additional, fewer and/or different components than those depicted in FIG. 2B. FIG. 2B is discussed in conjunction with FIG. 2C and FIG. 2D, which illustrate exemplary collected TV command storage 270 and an exemplary pattern of TV commands 280, respectively, which may be received and analyzed by feature recommendation device 250.

Data collecting module 252 may collect data regarding a plurality of TV commands 260 and store the collected data in collected TV command storage 270. Collected TV command storage 270 may be a memory/storage device. According to one embodiment, data collecting module 252 collects information regarding each TV command 260 and stores the information in collected TV command storage 270. For instance, data collecting module 252 may collect data regarding each TV command 260 as each command 260 is received from remote control 216. Collected TV command storage 270 may store these TV commands that include selections of features and other television viewer commands, such as accessing content (i.e., collected TV command data may be determined based on particular applications as well as specific content).

Figure 2C:
FIG. 2C is a table of exemplary TV commands.
Figure 2D:
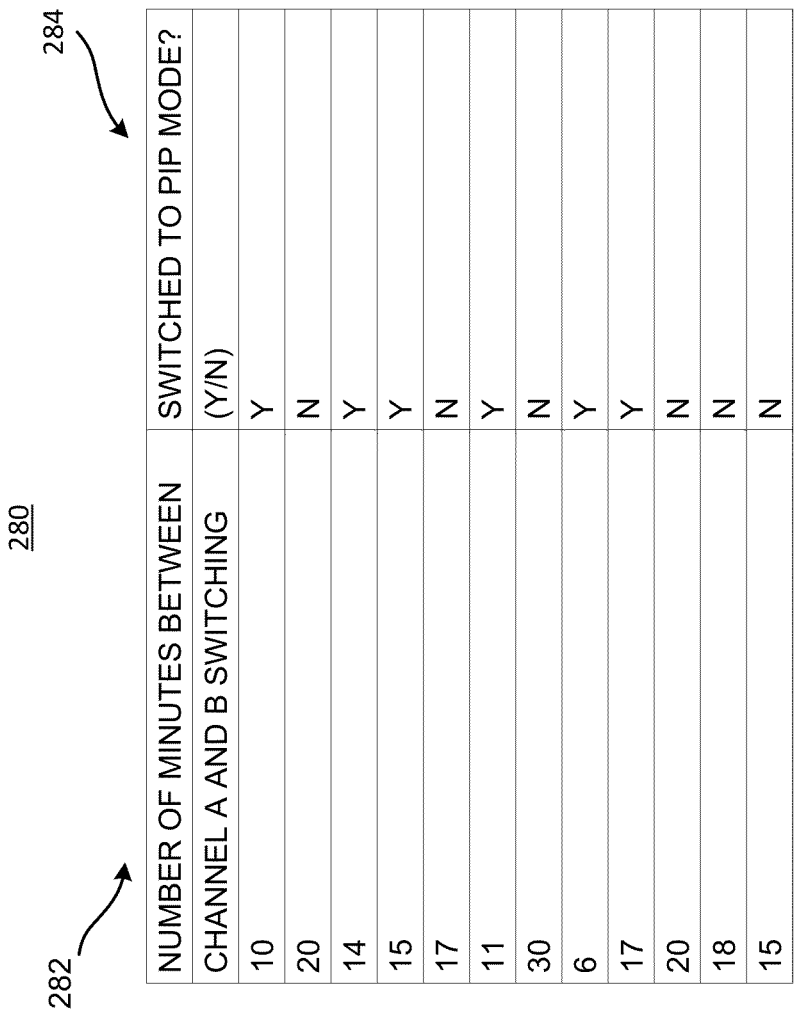
FIG. 2D is another table of exemplary TV commands.

Collected TV command storage 270 may be organized on the basis of TV command types 272a-272n (where a is any integer value), and corresponding event time stamps 274a-274n, prior values 276 and current values 278, etc., and stored in a table, as shown in FIG. 2C. TV command types 272a-272n may include commands associated with changing channels (illustrated as channel change 272a in FIG. 2C), initiating record mode (illustrated as record 272b in FIG. 2C), changing volume (volume change 272c in FIG. 2C), pressing a mute button for TV 102 (mute change 272d in FIG. 2C), changing captioning (caption change 272e in FIG. 2C), recalling previously viewed channel (recall 272f in FIG. 2C), pausing a TV program (pause 272g in FIG. 2C), turning TV on or off (power 272h in FIG. 2C), switching to an auxiliary mode (aux 272i in FIG. 2C), browsing a program menu (menu 272j in FIG. 2C), listing multiple TV programs (guide 272k in FIG. 2C), displaying information about current program (info 272l in FIG. 2C), switching to or from a PIP mode (illustrated as PIP 272m in FIG. 2C), etc. Additionally, data collecting module 252 may output collected TV command data in collected TV command storage 270 to data modeling module 254 as described below. Although particular TV command types 272a-272n are illustrated in FIG. 2C, collected TV command storage may store additional and/or different TV command types 272a-272n, for instance wide screen mode, foreign language subtitles, etc. Event time stamps 274a-274n for each TV command type 272 may be determined at an instant of a particular event, for instance channel change 272a, and stored in collected TV command storage 270. In some instances, an associated value of a TV command type 272a-272n may be changed at the occurrence of TV commands 260 of particular TV command types 272a-272n. For example, prior value 276 (illustrated as channel 123 in FIG. 2C) may be changed to a current value 278 (illustrated as channel 555 in FIG. 2C).

Data modeling module 254 may access collected TV command storage 270 and determine model or viewer patterns of TV commands 260 that correlate to selection of particular features. For instance, data modeling module 254 may receive collected TV command data from data collecting module 252 and analyze the collected TV command data for historical trends and usage patterns to determine a selection of a feature that corresponds to a model or viewer pattern of TV commands. The model pattern of TV commands may be used in a data model 262 to generate predictive recommendations. According to an embodiment, data modeling module 254 determines model patterns from collected TV command data based on data sets within predetermined parameters selected from the collected TV command data in storage 270. For example, data modeling module 254 may receive collected TV command data collected over a predetermined minimum time, for instance ten days. Data modeling module 254 may use this collected TV command data to identify correlations between a model or viewer pattern of TV commands (for example, sequences of TV commands having TV command types $272a$-$272n$) and a selection of a feature. Data modeling module 254 may determine a selection of a feature associated with TV commands 260 having particular TV command types $272a$-$272n$, event time stamps 274, current values 276, and/or previous values 278.

Data modeling module 254 may identify correlations within particular parameters. According to an embodiment, as described with respect to FIG. 2D and table 280, data modeling module 254 may identify a correlation between a pattern of TV commands 260, in this case minutes between occurrences of switching between channel A and channel B (illustrated as column 282 in FIG. 2D), and a selection of a feature, in this case switching to PIP mode (illustrated as column 284 in FIG. 2D). As an example, the first entry in column 282 of table 280 indicates that the viewer took ten minutes to switch from channel A to channel B. The first entry in column 284 indicates that the viewer switched to PIP mode after switching from channel A to channel B. Data modeling module 254 may determine within a predetermined confidence interval that a television viewer is likely to select a PIP feature before or after switching between particular channels, if the switch is completed within a time determined by data modeling module 254. For example, data modeling module 254 may determine that there is an 80% chance of a television viewer selecting PIP feature when switching between channel A and channel B after less than 15 minutes. Further, data modeling module 254 may be configured to output data models that exceed predetermined minimum confidence intervals. For example, data modeling module 254 may be configured to output data models with a 75% or greater chance of a selection of a feature occurring with the model pattern. In this case, data modeling module 254 may determine that data model 262 is valid and output data model 262 to feature recommending module 258.

As another example, a television viewer may switch to a music channel after watching a sports channel (channel change $272a$). The television viewer subsequently increases volume (volume change $272c$). This channel change $272a$ may occur multiple times with an accompanying volume change $272c$ occurring in greater than 90% of cases. Data modeling module 254 may identify an association between a selection of a feature, for example an increase in volume setting (volume change $272c$), and a particular pattern of TV commands 260, for example a switch to the music channel from the sports channel (change channel $272a$). In another example, television viewer may turn on/off a captioning setting (caption change $272e$) when switching to/from a particular channel. Data modeling module 254 may create a data model 262 based on this pattern of turning on/off captioning when the television viewer switches to/from that particular channel. Data modeling module 254 may output data models 262 based on these and similar identified correlations, associations and relationships between TV command types $272a$-$272n$ and selections of features to feature recommending module 258.

Current command identifying module 256 may identify a current pattern of TV commands 264 based on a model pattern of TV commands included in data model 262 determined by data modeling module 254 as described above. For instance, current command identifying module 256 may identify all channel changes $272a$ that occur within the previous 15 minutes (i.e., all channel changes $272a$ in a preceding 15 minute interval) as a part of current TV commands 260 based on a model provided by data modeling module 254. Current command identifying module 256 may identify a current pattern of TV commands 264 based on TV commands 260 received within predefined parameters. For example, current command identifying module 256 may identify current TV commands 260 based on a predetermined number of TV commands 260 that have been received preceding or concurrent to a present time. Alternatively, current command identifying module 256 may identify current TV commands 260 based on a position in a sequence of TV commands 260. Additionally, current command identifying module 256 may identify current TV commands 260 based on TV command types $272a$-$272n$ occurring within a predetermined time. For instance, current command identifying module 256 may identify a predetermined number of current channel changes $272a$ and a selection of PIP mode $272m$, i.e., channel changes $272a$ and PIP mode changes $272m$ immediately preceding a current time. Current command identifying module 256 may identify current TV commands based on a plurality of models and parameters.

Feature recommending module 258 may provide feature recommendation messages 108 based on matching current patterns of TV commands 264 and model patterns of TV commands included in data model 262. For example, feature recommending module 258 may compare a model pattern of TV commands provided by data modeling module 254 with a current pattern of TV commands 262 to determine whether to recommend a particular feature in association with current pattern of TV commands 264 of particular TV command types $272a$-$272n$ received within a defined time. According to an embodiment, as described with respect to FIG. 2D and table 280, feature recommending module 258 may receive a current pattern of TV commands 264 that includes switching between channel A and channel B after 12 minutes. Feature recommending module 258 may output a feature recommendation message 108 to TV 102, for instance similarly as described with respect to FIG. 1, in response to a determination that a current pattern of TV commands 260 substantially matches a model pattern of TV commands, provided for instance in data model 262. According to a further embodiment, feature recommending module 258 may automatically implement a selected feature based on particular current pattern of TV commands 260. In some cases, after the automatic implementation of the feature, feature recommending device 250 may output a "pop-up" inquiring whether the implemented feature is acceptable. Viewer responses to feature recommendation messages 108 may be used to further refine an accuracy of prediction of data models determined by data modeling module 254. Feature recommendation messages 108 may also include an option to prevent repeat occurrences of particular feature recommendation messages 108.

According to one embodiment, feature recommending module 258 may provide a feature recommendation message 108 based on an availability of a particular feature. For example, if the television viewer was watching a non-HD channel, feature recommending module 258 may output a feature recommendation message 108 recommending a switch from the non-HD channel to the HD version of the channel based on historical data available, including prior responses to similar feature recommendation messages 108 and an availability of an HD version of the program. The feature recommendation message 108 may prompt the viewer as follows: "The program you are watching is also available on HD Channel number 454; Do you wish to switch to the HD channel?"

According to another embodiment, feature recommending module 258 may generate feature recommendation messages 108 based on future availability of a feature. For example, if the viewer starts watching a TV program which is already in progress and was not being recorded, and decides to record the remainder of the program, feature recommending module 258 may check a program guide to verify if the same program is being repeated within a predetermined future time (for example, within the next 7 days) and generate a feature recommendation messages 108. The feature recommendation message 108 may prompt the viewer as follows: "The program you wish to record has already started. The current program being recorded will be rebroadcasted tomorrow at 4 pm. Do you wish to record the entire program tomorrow or continue recording the partial program?"

Although feature recommendation device 250 is described with respect to STB 214, it should be understood that device 250 may be implemented in other configurations in network 200. For example, data collecting module 252 and data modeling module 254 may be implemented for a plurality of customer premises networks 210 that receive service from provider network 220. According to this embodiment, TV commands 260 may be analyzed for all customers or subgroups of customers of a telecommunications service provider that provides programming content in network 200. The data models created by data modeling module 254 may be output to feature recommendation devices 250 on each customer premises network 210.

Figure 3:
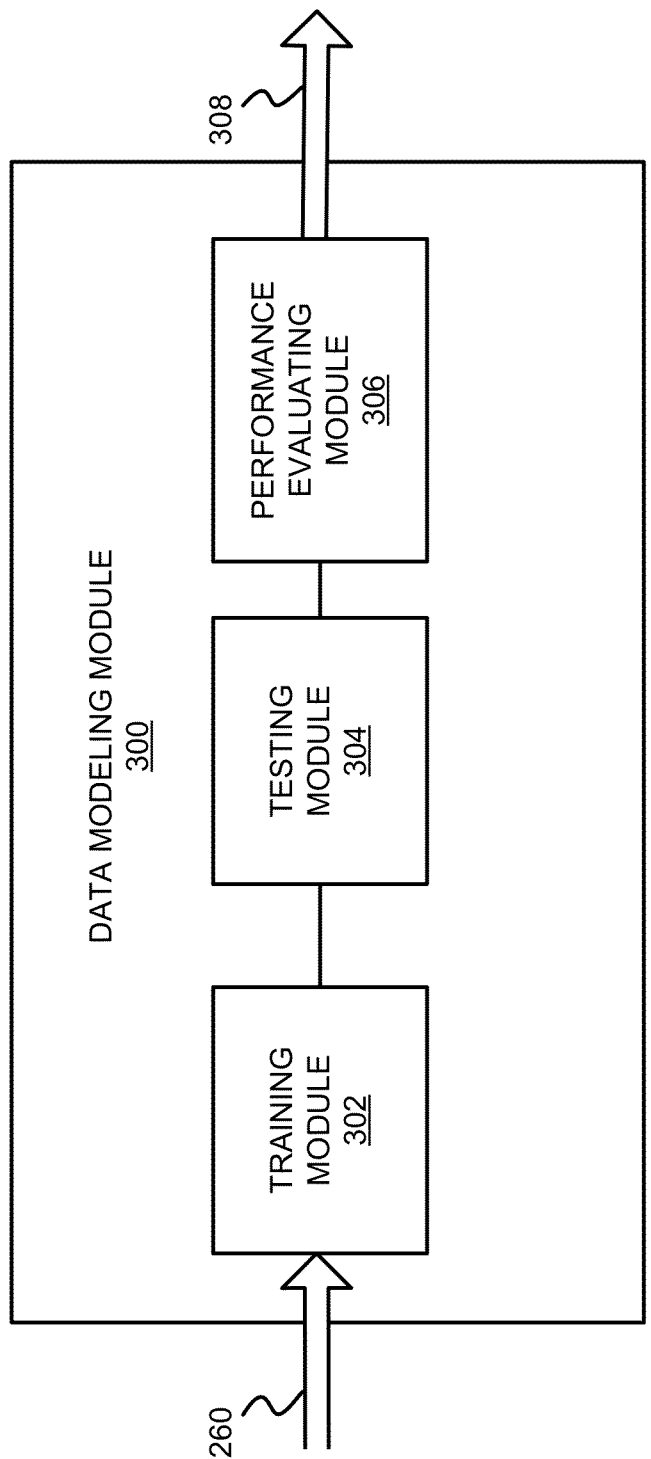
FIG. 3 is a functional block diagram of an exemplary data modeling module.

FIG. 3 illustrates a functional block diagram of a data modeling module 300. Data modeling module 300 may be implemented as a component of a feature recommendation device, such as data modeling module 254 described with respect to feature recommendation device 250. In another embodiment, data modeling module 300 may be implemented as a "stand alone" device (i.e., a device is not integrated with another device) that provides data models for a plurality of customer premises networks 210 in provider network 220. Data modeling module 300 includes a training module 302, a testing module 304 and a performance evaluating module 306. The configuration of components of data modeling module 300 illustrated in FIG. 3 is for illustrative purposes only. Other configurations may be implemented. Therefore, data modeling module 300 may include additional, fewer and/or different components than those depicted in FIG. 3.

Training module 302 may receive a plurality of TV commands 260 for TV 102. For example, training module 302 may access TV commands 260 stored as collected TV command data in storage 270. In addition, training module 302 may receive TV commands 260 in real time or near real time as a television viewer inputs TV commands 260, for instance using remote control 216. Training module 302 may determine multiple sets of data from collected TV command storage 270. For instance, training module 302 may perform split validation and randomly split collected TV command data into a training data set and a test data set. Training module 302 performs split validation on the collected TV command data to assess the results of a statistical analysis of the training data set on an independent data set, in this case the testing data set.

Training module 302 may use the training data set to determine a prospective data model that defines a relationship between a prospective pattern of TV commands and a prospective selection of a feature. According to an embodiment, training module 302 may apply k-nearest neighbor (K-NN) pattern recognition to the training data set and determine one or more prospective data models that define a relationship(s) between prospective pattern of TV commands 260 and selection of particular features. Further, the prospective data models may classify various prospective patterns and/or sequences of TV commands 260 based on closest examples in the training data set. For example, training module 302 may identify a pattern of switching to PIP mode 272m after switching between two channels within five seconds (channel change 272a) and a pattern of remaining in single channel mode after switching between the two channels after seven seconds. Training module 302 may also identify an instance of switching between two channels within 5.5 seconds. Training module 302 may determine that a nearest neighbor is five seconds (channel change 272a) and output a test feature recommendation to switch to PIP mode 272m. Training module 302 may determine the prospective data model based on analysis of patterns and/or sequences of TV commands and selections of particular features.

Testing module 304 may apply the prospective data models to the test data set to determine test feature recommendations. For example, testing module 304 may identify a test pattern of TV commands 260 in the testing data set that conforms to a prospective sequence in a prospective data model determined by training module 302. Testing module 304 may output a test data model including a test pattern of TV commands and resulting test feature recommendation (i.e., a test selection of a feature) to performance evaluating module 306. The test selection of a feature may correspond in some instances to a selection of a different feature than the prospective selection of a feature. In other instances, the test selection of a feature may correspond to a non-selection of the feature, i.e., the test pattern of TV commands does not correspond to a selection of a feature. According to an example, testing module 304 may identify a sequence of switching between two channels after six seconds within the test data set. Testing module 304 may output the prospective data model, the test pattern of TV commands and the test feature recommendation to performance evaluating module 306.

Performance evaluating module 306 may evaluate a validity of a prospective data model by comparing the test feature recommendation to a prospective selection of a feature included in prospective data model. According to an embodiment, performance evaluating module 306 may receive the prospective data model and the test feature recommendation from the testing module 304. For example, performance evaluating module 306 may receive the prospective data model for switching between two channels described above with respect to training module 302 and testing module 304. Performance evaluating module 306 may determine that the prospective data model is valid for a particular sequence when the test selection of a feature substantially matches the prospective selection of a feature in the test data set. Performance evaluating module 306 may repeat this evaluation for multiple instances of prospective patterns of TV commands 260 in the test data set. Performance evaluating module 306 may determine that a prospective data model is valid if the test selections of features are valid for a predetermined threshold, for instance a predetermined percentage of the test selections of features match the prospective selections of features. Performance evaluating module 306 may output the prospective data model as a valid data model.

Data modeling module 300 may perform real time or near real time refinement of the data models. For example, a data model may be adjusted based upon additional data received, for instance as a television viewer accepts or rejects feature recommendations and/or as the television viewer selects particular features. Data modeling module 300 may also determine additional data models based upon changes to the data sets as additional TV commands 260 are received. Further, valid data models may become invalid as additional TV commands 260 are received.

Figure 4:
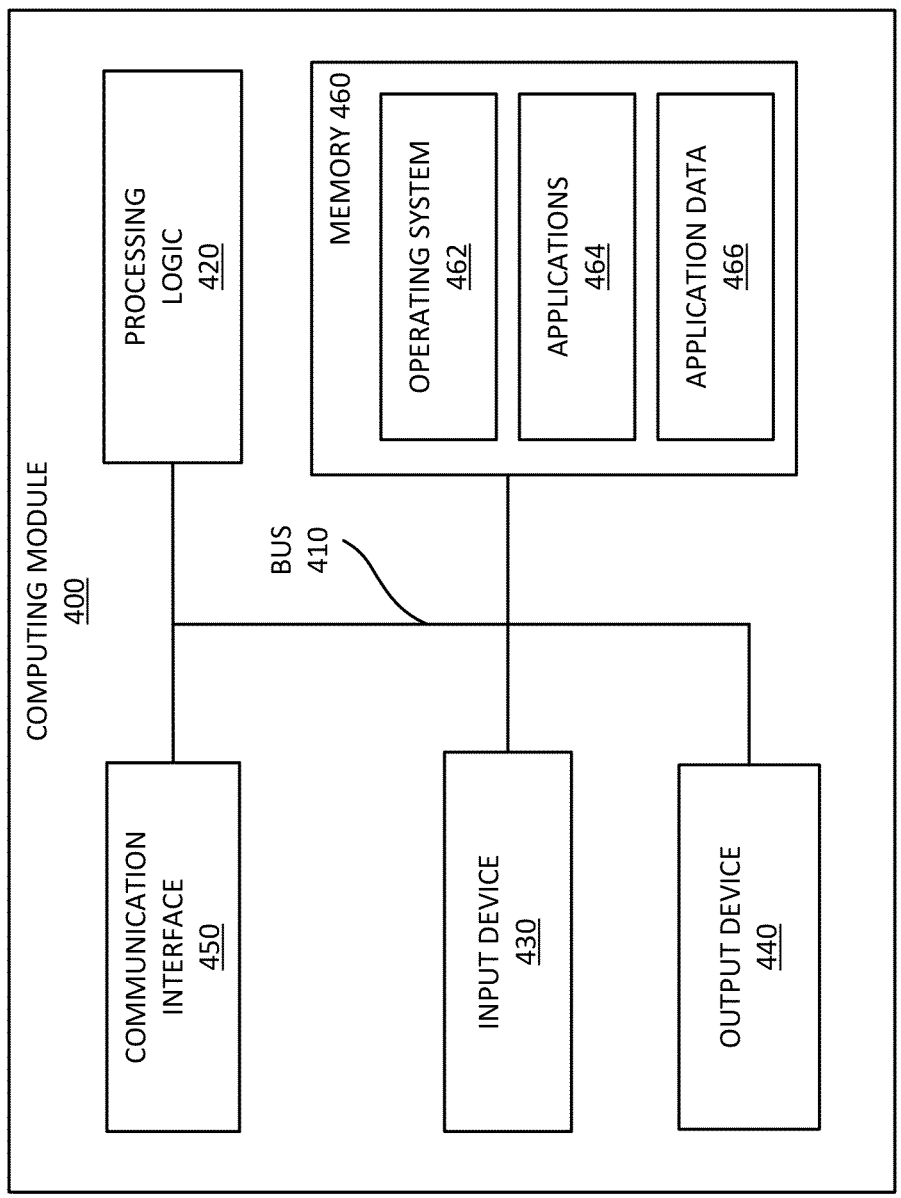
FIG. 4 is a block diagram of exemplary components of one or more of the devices of FIG. 2A.

Devices in network 200 may each include one or more computing modules. FIG. 4 is a block diagram of exemplary components of a computing module 400. Computing module 400 may include a bus 410, processing logic 420, an input device 430, an output device 440, a communication interface 450, and a memory 460. Computing module 400 may include other components (not shown) that aid in receiving, transmitting, and/or processing data. Moreover, other configurations of components in computing module 400 are possible.

Bus 410 may include a path that permits communication among the components of computing module 400. Processing logic 420 may include any type of processor or microprocessor (or families of processors or microprocessors) that interprets and executes instructions. In other embodiments, processing logic 420 may include an application-specific integrated circuit (ASIC), a field-programmable gate array (FPGA), a multi-core processor, a reduced-instruction set code (RISC) processor, etc.

Input device 430 may allow a user to input information into computing module 400. Input device 430 may include a keyboard, a mouse, a pen, a microphone, a remote control, an audio capture device, an image and/or video capture device, a touch-screen display, etc. In some instances, some devices may be managed remotely and may not include input device 430. In other words, some devices may be "headless" and may not include a keyboard, for example.

Output device 440 may output information to the user. Output device 440 may include a display, a speaker, etc. For example, devices may include a liquid-crystal display (LCD) for displaying information to the user, such as a channel and a feature recommendation message 108.

Input device 430 and output device 440 may allow a user to activate and interact with a particular service or application, such as a closed captioning application. Input device 430 and output device 440 may allow a user to receive and view a menu of options and select from the menu options. The menu may allow the user to select various functions or services associated with applications executed by computing module 400.

Communication interface 450 may include a transceiver that enables computing module 400 to communicate with other devices or systems. Communication interface 450 may include a transmitter that converts baseband signals to radio frequency (RF) signals or a receiver that converts RF signals to baseband signals. Communication interface 450 may be coupled to an antenna for transmitting and receiving RF signals. Communication interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface, a radio-frequency identification (RFID) interface, a near-field communications (NFC) wireless interface, etc.

Memory 460 may store, among other things, information and instructions (e.g., applications 464 and operating system 462) and data (e.g., application data 466) for use by processing logic 420. Memory 460 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 462 may include software instructions for managing hardware and software resources of computing module 400. For example, operating system 462 may include Linux, Windows, OS X, OpenSolaris, Unix, etc. In instances in which user device 412 is a mobile phone, for example, operating system 462 may include MeeGo, Android, WebOS, iOS, Symbian, etc. Applications 464 and application data 466 may provide network services or include applications, depending on the device in which the particular computing module 400 is implemented.

In an exemplary implementation, computing module 400 may perform the operations described herein in response to processing logic 420 executing software instructions contained in a computer-readable medium, such as memory 460. A computer-readable medium may be defined as a physical or logical memory device. The software instructions may be read into memory 460 from another computer-readable medium (e.g., a hard disk drive (HDD), SSD, etc.), or from another device via communication interface 450. Alternatively, hard-wired circuitry may be used in place of or in combination with software instructions to implement processes consistent with the implementations described herein. Thus, implementations described herein are not limited to any specific combination of hardware circuitry and software.

Figure 5A:
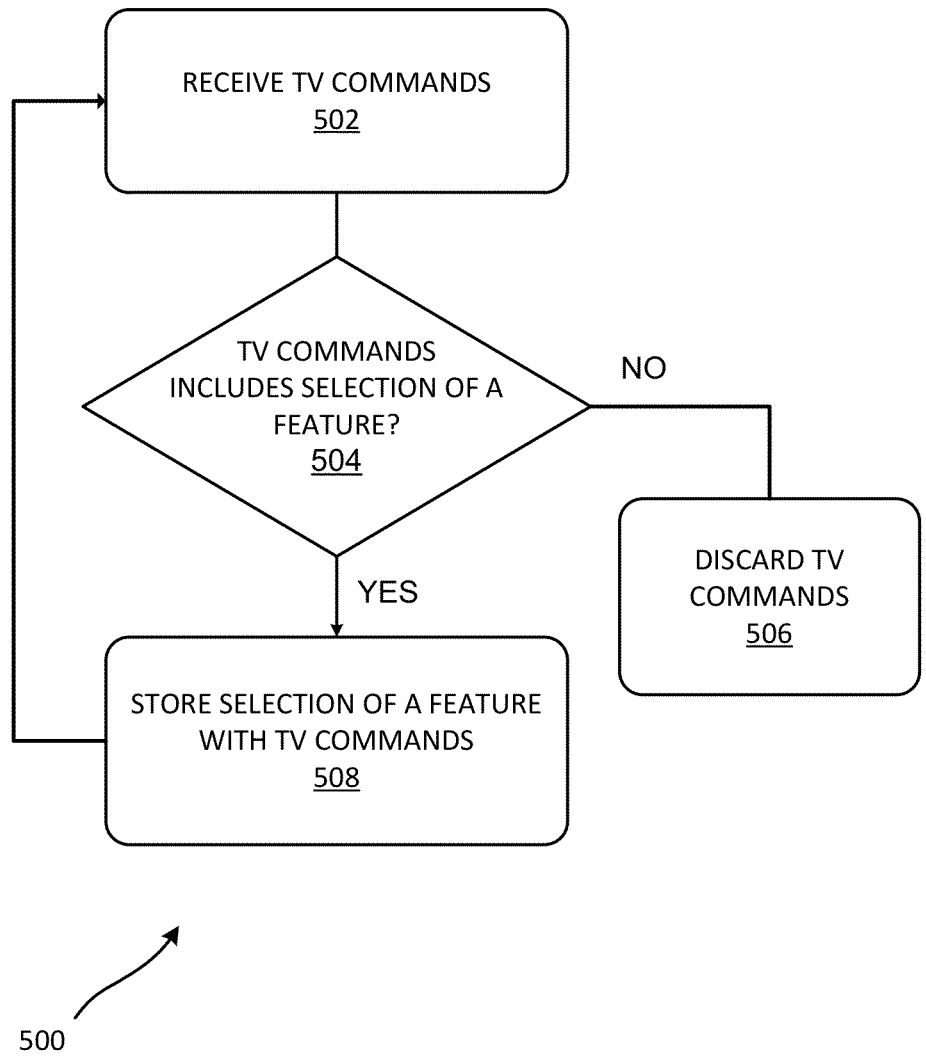
FIG. 5A is a flowchart of an exemplary process for collecting TV commands.

FIG. 5A is a flowchart of an exemplary process 500 for collecting TV commands 260. Exemplary TV commands 260 and TV command types 272a-272n associated with process 500 are described in conjunction with the exemplary commands in storage 270 in FIG. 2C and table 280 in FIG. 2D. Process 500 may execute in a device, for instance a feature recommendation device 250 described in conjunction with FIG. 2B. Alternatively, process 500 may execute in a system, for instance a network management system 224 described in conjunction with FIG. 2B. It should be apparent that the process discussed below with respect to FIG. 5A represents a generalized illustration and that other elements may be added or existing elements may be removed, modified or rearranged without departing from the scope of process 500. Process 500 may illustrate a single iteration of a cyclical process. In other words, data collecting module 252 may receive additional TV commands 260 concurrently, or following a particular iteration of process 500.

At block 502, data collecting module 252 may receive a number of TV commands 260. According to an embodiment, data collecting module 252 may be a component of STB 214 and may receive TV commands 260 from remote control 216 as television viewer inputs instructions through remote control 216 to control TV 102 and/or STB 214 in a customer premises network 210. Alternatively, data collecting module 252 may be a component of network management system 224 and may receive TV commands 260 from a plurality of customer premises networks 210 routed, for instance, through STBs 214 in each customer premises network 210 to a provider network 220 in which network management system 224 is located. In either instance, data collecting module 252 may receive TV commands 260 that include different TV command types 272a-272n, for instance as shown in FIG. 2C, and having corresponding event time stamps 274a-274n, prior values 276 and current values 278, etc.

At block 504, data collecting module 252 may determine whether TV commands 260 include selections of features, such as PIP mode 272m, volume changes 272c, etc., and other instructions regarding applications or settings for TV 102. For instance, data collecting module 252 may receive TV commands 260 in real time or near real time as TV commands 260 are input to TV 102 and/or STB 214. Data collecting module 252 may store TV commands 260 temporarily as TV commands 260 are received.

At block 506, data collecting module 252 may determine whether the TV commands include selection of a feature. When the TV commands do not include selection of a feature (block 504—no), data collecting module 252 may discard TV commands that do not include a selection of a feature (block 506). For example, data collecting module 252 may receive TV commands 260 that are channel change 272a TV commands 260 (i.e., television viewer is randomly channel surfing). Data collecting module 252 may determine to discard these TV commands 260 after a predetermined time or number of TV commands 260.

At block 508, data collecting module 252 may store the plurality of TV commands 260 and the selection of a feature in collected TV command storage 270 in response to a determination that received TV commands 260 include a selection of a feature (block 504—yes). For instance, data collecting module 252 may store TV commands received within predetermined parameters of the selection of a feature with the selection of the feature in collected TV command storage 270. According to an embodiment, data collecting module 252 may store TV commands 260 received within a predetermined time, preceding or following the selection of the feature. Alternatively, data collecting module 252 may store TV commands 260 received within a predetermined number of TV commands 260, preceding or following the selection of the feature.

Data collecting module 252 may receive a number of TV commands 260 from which statistically significant samples may be determined. Data collecting module 252 may receive and store the plurality of TV commands 260 over a statistically significant time and/or number of TV commands 260. Data collecting module 252 may store the plurality of TV commands 260 in storage 270 for a predetermined time. Alternatively, data collecting module 252 may store the plurality of TV commands 260 for an indefinite time.

Figure 5B:
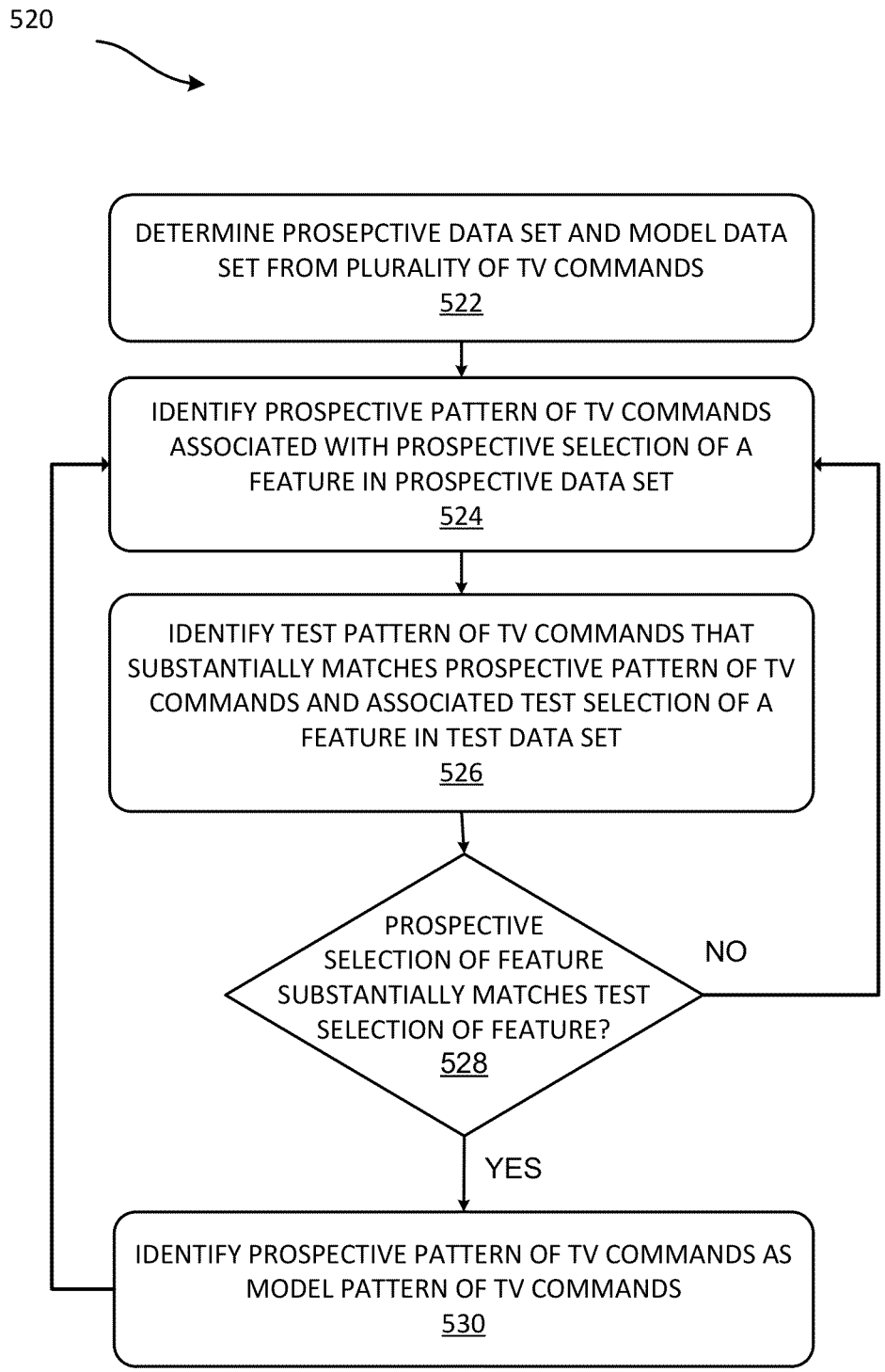
FIG. 5B is a flowchart of an exemplary process for determining a model pattern of TV commands corresponding with a model selection of a feature.

FIG. 5B is a flowchart of an exemplary process 520 for determining a model pattern of TV commands 260 corresponding with a model selection of a feature. Process 520 may execute in a device or in a module of a device, for instance data modeling module 300 described in conjunction with FIG. 3. It should be apparent that the process discussed below with respect to FIG. 5B represents a generalized illustration and that other elements may be added or existing elements may be removed, modified or rearranged without departing from the scope of process 520.

At block 522, data modeling module 300 may determine a prospective data set and a model data set from a plurality of TV commands 260. For instance, data modeling module 300 may access TV commands 260 stored in collected TV command storage 270. Data modeling module 300 may determine the test data set and the prospective data set from plurality of TV commands 260 by performing split validation of the plurality of TV commands 260. For example, data modeling module 300 may randomly assign some of TV commands 260 to the prospective data set while remaining TV commands 260 may be assigned to the test data set.

At block 524, training module 302 may identify a prospective pattern of TV commands 260 and a prospective selection of a feature in the prospective data set. For example, training module 302 may identify a correlation between a selection of a feature and a pattern of TV commands 260. Training module 302 may create a prospective data model that defines a relationship between the prospective pattern (i.e., a recurring sequence) of TV commands 260 and the prospective selection of a feature.

At block 526, testing module 304 may identify a test pattern of TV commands 260 in the test data set that substantially matches the prospective pattern of TV commands 260 (determined at block 524). Testing module 304 may also identify a test selection of a feature associated with the test pattern of TV commands 260 in the test data set. For example, testing module 304 may identify TV commands 260 in the test data set that substantially correspond to the prospective pattern of TV commands 260. Testing module 304 may also determine whether a test selection of a feature occurs with the test pattern of TV commands 260 in the test data set.

Testing module 304 may determine whether the prospective selection of a feature matches the test selection of the feature at block 528. If the prospective selection of a feature matches (block 528—yes), testing module 304 may identify the prospective pattern of TV commands 260 as a model pattern of TV commands 260 (block 530). If the prospective selection does not match (block 528—no), processing may continue at block 524.

Data modeling module 300 may perform multiple iterations of process 520 in order to determine a sufficient confidence level for a data model that defines a relationship between the prospective pattern (i.e., a recurring sequence) of TV commands 260 and the prospective selection of a feature. Performance evaluating module 306 may determine that the prospective model is valid (i.e., the prospective pattern and prospective selection of the feature may be output as a data model) in instances in which a minimum predetermined ratio of test selections of the feature in the test data set substantially matches the prospective selection of the feature.

Figure 5C:
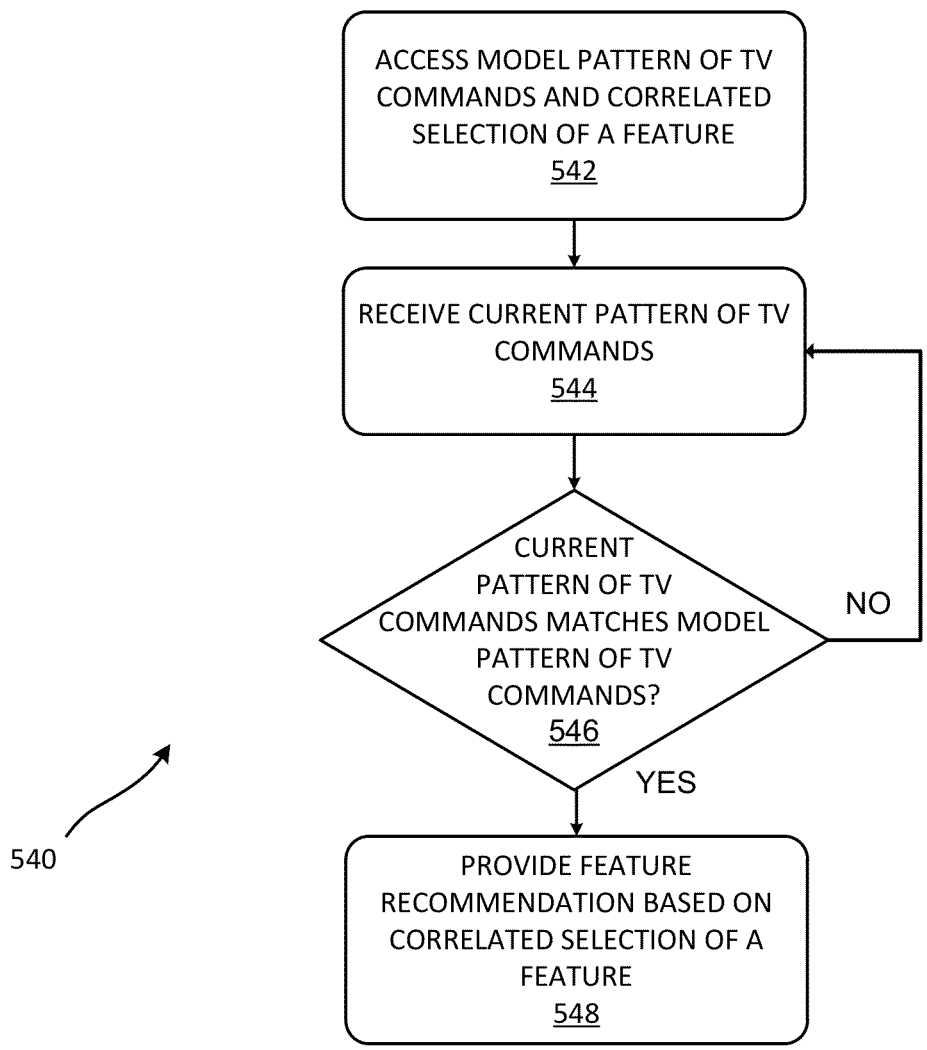
FIG. 5C is a flowchart of an exemplary process for providing a feature recommendation for a TV based on matching a current pattern of TV commands with a model pattern of TV commands.

FIG. 5C is a flowchart of an exemplary process 540 for providing a feature recommendation for a TV based on matching a current pattern of TV commands with a model pattern of TV commands. Process 540 may execute in a device or in a module of a device, for instance feature recommending module 258 of feature recommendation device 250 described in conjunction with FIG. 2B. It should be apparent that the process discussed below with respect to FIG. 5C represents a generalized illustration and that other elements may be added or existing elements may be removed, modified or rearranged without departing from the scope of process 540.

At block 542, feature recommending module 258 may access a data model that defines a relationship between the model pattern of TV commands 260 and the model selection of a feature, such as the data model identified by data modeling module 254. According to an example, feature recommending module 258 may receive a data model determined as described above with respect to process 520. Alternatively, feature recommending module 258 may receive a predetermined data model of a correlation between a pattern of TV commands 260 and a selection of a feature, for instance from provider network 220. According to an example, the predetermined data model may provide closed captioning in response to a combination of TV commands 260 to rewind a program within particular parameters (for example a predetermined maximum number of seconds) and increase volume (i.e., indicating that television viewer may be trying to hear subtle/obscured audio).

At block 544, feature recommending module 258 may receive a current pattern of TV commands 264. For example, feature recommending module 258 may receive current pattern of TV commands 264 from current command identifying module 256. Current command identifying module 256 may receive at least one additional TV command 260 when a television viewer uses remote control 216 to input commands to TV 102. Current command identifying module 256 may identify current pattern of TV commands 264 based on predetermined parameters, such as time, a number of TV commands 260 and/or particular TV command types 272a-272n.

At block 546, feature recommending module 258 may determine whether current pattern of TV commands 264 matches a model pattern of TV commands. For example, feature recommending module 258 may compare current pattern of TV commands 264 to a model pattern of TV commands provided in the data model, such as the data model identified by data modeling module 254.

If the current pattern substantially matches or includes the model pattern (block 546—yes), feature recommending module 258 may provide at least one feature recommendation in response to a determination that current activity matches the pattern of TV commands (block 548). For example, feature recommending module 258 may compare current pattern of TV commands 264 and provide a feature recommendation message 108 based on a substantial match between current pattern of TV commands 264 and a model pattern of TV commands. Feature recommendation message 108 may automatically perform a selection of a feature and/or provide an option for a television viewer to select a particular feature. In cases in which current pattern of TV commands 264 does not match the data model (block 546—no), current command identifying module 256 may continue to monitor current activity (block 544). Additionally, the plurality of TV commands 260 may be updated using the current activity and the data models may be refined, inactivated and/or created based on the updated of TV commands 260.

The foregoing description provides illustration and description, but is not intended to be exhaustive or to limit the embodiments to the precise form disclosed. Modifications and variations are possible in light of the above teachings or may be acquired from practice of the invention. For example, while TV commands have been described with respect to a TV and a single user, other user devices and different methods of providing a signal to the user device may be used in other implementations. In other implementations, feature recommendations may be provided when viewing other types of content, such as Internet surfing, based on prior user behavior and a generated model regarding the user's viewing/accessing behavior. Further, non-dependent processes and acts may be performed in parallel and/or separately from each other.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    accessing television (TV) command data including a plurality of TV commands for controlling a TV, wherein the plurality of TV commands includes at least one selection of a feature of the TV and wherein the feature of the TV comprises at least one of an application or setting for the TV and is not a channel change command;
    identifying that at least one user selects a particular feature of the TV based on the TV command data;
    analyzing the TV command data to determine a model pattern of TV commands that correlates with the at least one user selecting the particular feature of the TV, wherein analyzing the TV command data includes:
        determining a prospective data set and a test data set from the plurality of TV commands,
        identifying a prospective pattern of TV commands associated with a prospective selection of a feature in the prospective data set,
        identifying a test pattern of TV commands associated with a test selection of a feature of the TV in the test data set, wherein the test pattern of TV commands substantially matches the prospective pattern of TV commands,
        determining whether the prospective selection of the feature of the TV substantially matches the test selection of the feature of the TV, and
        identifying the prospective pattern of TV commands as the model pattern of TV commands in response to a determination that the prospective selection of the feature of the TV substantially matches the test selection of the feature of the TV;
    identifying a current pattern of TV commands based on TV commands received within predefined parameters;
    determining whether the current pattern of TV commands substantially matches the model pattern of TV commands; and
    providing a feature recommendation for the particular feature of the TV in response to a determination that the current pattern of TV commands substantially matches the model pattern of TV commands, wherein the feature recommendation includes information regarding one of an existence of the particular feature of the TV or an applicability of the particular feature of the TV to a television viewer's current TV activity.

2. The computer-implemented method of claim 1, wherein the plurality of TV commands includes at least one of setting a future recording time for a program, adjusting volume, muting the TV, turning on close caption, recalling a previous channel, pausing a program, switching to an auxiliary mode, browsing a program menu, listing multiple TV programs, switching to PIP mode or recording a program.

3. The computer-implemented method of claim 1, wherein the particular feature of the TV comprises at least one of high definition mode, recording mode, widescreen mode, close captioning, sharpness, brightness, volume or recording mode.

4. The computer-implemented method of claim 1, wherein the TV command data further includes one or more of an event time stamp of a command, a current value or a prior value.

5. The computer-implemented method of claim 1, wherein determining the prospective data set and the test data set from the plurality of TV commands further comprises:
performing split validation on the plurality of TV commands to determine the prospective data set and the test data set.

6. The computer-implemented method of claim 1, further comprising:
receiving at least one of an additional TV command or a selection of a feature of the TV; and
updating the plurality of TV commands based on the at least one of the additional TV command or the selection of the feature of the TV.

7. The computer-implemented method of claim 1, wherein providing the feature recommendation comprises providing the feature recommendation based on a future availability of the particular feature of the TV.

8. The computer-implemented method of claim 1, wherein the plurality of TV commands is collected from a plurality of customer premises networks.

9. The computer-implemented method of claim 8, wherein the plurality of TV commands are collected for at least one of a predetermined time or a number of TV commands.

10. A device comprising:
a memory to store a plurality of instructions; and
a processor to execute instructions in the memory to:
access user device command data including a plurality of user device commands for controlling a user device associated with a television (TV), wherein the plurality of user device commands includes at least one selection of a feature of the TV or the user device and the feature comprises at least one of an application, an audio setting or a video setting for the TV or the user device;
identify that at least one user selects a particular feature of the TV or the user device based on the user device command data;
analyze the user device command data to determine a model pattern of user device commands that is correlated with the at least one user selecting the particular feature of the TV or the user device, wherein when analyzing the user device command data the processor is further to
determine a prospective data set and a test data set from the plurality of user device commands,
identify a prospective pattern of user device commands associated with a prospective selection of a feature of the TV or the user device in the prospective data set,
identify a test pattern of user device commands associated with a test selection of a feature of the TV or the user device in the test data set, wherein the test pattern of user device commands substantially matches the prospective pattern of user device commands, and
identify the prospective pattern of user device commands as the model pattern of user device commands in response to a determination that the prospective selection of the feature substantially matches the test selection of the feature of the TV or the user device;
identify a current pattern of user device commands based on user device commands received within predefined parameters;
determine whether the current pattern of user device commands substantially matches the model pattern of user device commands; and
provide a feature recommendation based on the at least one user selecting the particular feature of the TV or the user device in response to a determination that the current pattern of user device commands substantially matches the model pattern of user device commands.

11. The device of claim 10, wherein the plurality of user device commands includes at least one of changing a channel, adjusting volume, muting the user device, turning on close caption, recalling a previous channel, pausing a program, switching to an auxiliary mode, setting a future recording time for a program, browsing a program menu, switching to PIP mode or recording a program.

12. The device of claim 10, wherein the feature of the TV or the user device comprises at least one of picture in picture mode, widescreen mode, close captioning, sharpness, brightness, volume or recording mode.

13. The device of claim 10, wherein the user device command data further includes one or more of an event time stamp of a command, a current value or a prior value.

14. The device of claim 10, wherein when determining the prospective data set and the test data set from the plurality of user device commands, the processor is further configured to:
perform split validation on the plurality of user device commands to determine the prospective data set and the test data set.

15. The device of claim 10, wherein the processor is further configured to:
receive at least one of an additional user device command or a selection of a feature; and
update the plurality of user commands based on the at least one of the additional user device command or the selection of the feature of the TV or the user device.

16. The device of claim 10, wherein the processor is further configured to provide the feature recommendation based on a future availability of the feature of the TV or the user device.

17. A non-transitory computer-readable medium including instructions to be executed by a processor, the instructions including one or more instructions, which when executed by the processor, for causing the processor to:
access user device command data including a plurality of user device commands for controlling a user device, wherein the plurality of user device commands includes at least one selection of a feature of the user device and the feature comprises at least one of an application or setting for the user device and is not a channel change command;
identify that at least one user selects a particular feature of the TV based on the TV command data;
analyze the user device command data to determine a first pattern of user device commands that correlates with the at least one user selecting the particular feature of the user device, wherein when analyzing the user device command data the instructions further include
determine a prospective data set and a test data set from the plurality of user device commands;
identify a prospective pattern of user device commands associated with a prospective selection of a feature of the user device in the prospective data set;

identify a test pattern of user device commands associated with a test selection of a feature of the user device in the test data set, wherein the test pattern of user device commands substantially matches the prospective pattern of user device commands;

determine whether the prospective selection of the feature substantially matches the test selection of the feature of the user device; and identify the prospective pattern of user device commands as the first pattern of user device commands in response to a determination that the prospective selection of the feature substantially matches the test selection of the feature of the user device, identify a current pattern of user device commands based on user device commands received within predefined parameters;

determine whether the current pattern of user device commands substantially matches the first pattern of user device commands;

provide a feature recommendation based on the at least one user selecting the particular feature of the user device in response to a determination that the current pattern of user device commands substantially matches the first pattern of user device commands;

receive at least one of an additional user device command or a selection of a feature of the user device; and update the plurality of user device commands based on the at least one of the additional user device command or the selection of the feature of the user device.

* * * * *